United States Patent
Guerra et al.

(10) Patent No.: US 7,485,999 B2
(45) Date of Patent: Feb. 3, 2009

(54) ELECTRICAL MACHINE

(75) Inventors: Gianfranco Guerra, Birr (CH); Daniel Hediger, Othmarsingen (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 11/690,202

(22) Filed: Mar. 23, 2007

(65) Prior Publication Data

US 2007/0257852 A1 Nov. 8, 2007

Related U.S. Application Data

(63) Continuation of application No. PCT/EP2005/054915, filed on Sep. 29, 2005.

(30) Foreign Application Priority Data

Oct. 13, 2004 (CH) .................................. 1690/04

(51) Int. Cl.
*H02K 1/12* (2006.01)
(52) U.S. Cl. ........................................ 310/258; 310/89
(58) Field of Classification Search ................. 310/258, 310/89, 91
See application file for complete search history.

(56) References Cited

U.S. PATENT DOCUMENTS

| | | | | |
|---|---|---|---|---|
| 2,632,861 | A | * | 3/1953 | Morton et al. ............... 310/258 |
| 2,885,580 | A | * | 5/1959 | Scanlon et al. .............. 310/258 |
| 4,134,036 | A | | 1/1979 | Curtiss |
| 5,397,950 | A | * | 3/1995 | Norbury et al. ............... 310/91 |
| 6,091,177 | A | | 7/2000 | Carbonell et al. |
| 2002/0074894 | A1 | | 6/2002 | Fuller |

FOREIGN PATENT DOCUMENTS

| | | |
|---|---|---|
| DE | 19960224 | 6/2001 |
| EP | 0166114 | 1/1986 |
| EP | 367490 | 5/1990 |
| EP | 0633643 | 1/1995 |
| EP | 1083647 | 3/2001 |
| WO | WO2006/040266 | 4/2006 |

OTHER PUBLICATIONS

Search Report for Swiss Patent App. No. 1690/2004 (Mar. 16, 2005).
International Search Report for PCT Patent App. No. PCT/EP2005/054915 (Jan. 20, 2006).

* cited by examiner

*Primary Examiner*—Nguyen N Hanh
(74) *Attorney, Agent, or Firm*—Cermak Kenealy Vaidya & Nakajima LLP; Adam J. Cermak

(57) ABSTRACT

An electrical machine (10) has a built-in stator (11) which is mounted in a housing (12, 13, 14) by a built-in stator suspension, in particular in the form of a plurality of supporting rings (29) which are arranged one behind the other, at a distance apart, in the axial direction and surround the built-in stator (11), which housing (12, 13, 14) surrounds the built-in stator (11) at a distance from it, with additional apparatuses (38, 39) being provided in order to fix the housing (12, 13, 14) relative to the built-in stator (11) and with respect to the built-in stator suspension (29). In a machine such as this, the housing oscillations are minimized without any deterioration in the robustness that is required for transportation in that the fixing apparatuses (38, 39) are apparatuses which can be adjusted from outside the housing (12, 13, 14).

12 Claims, 6 Drawing Sheets

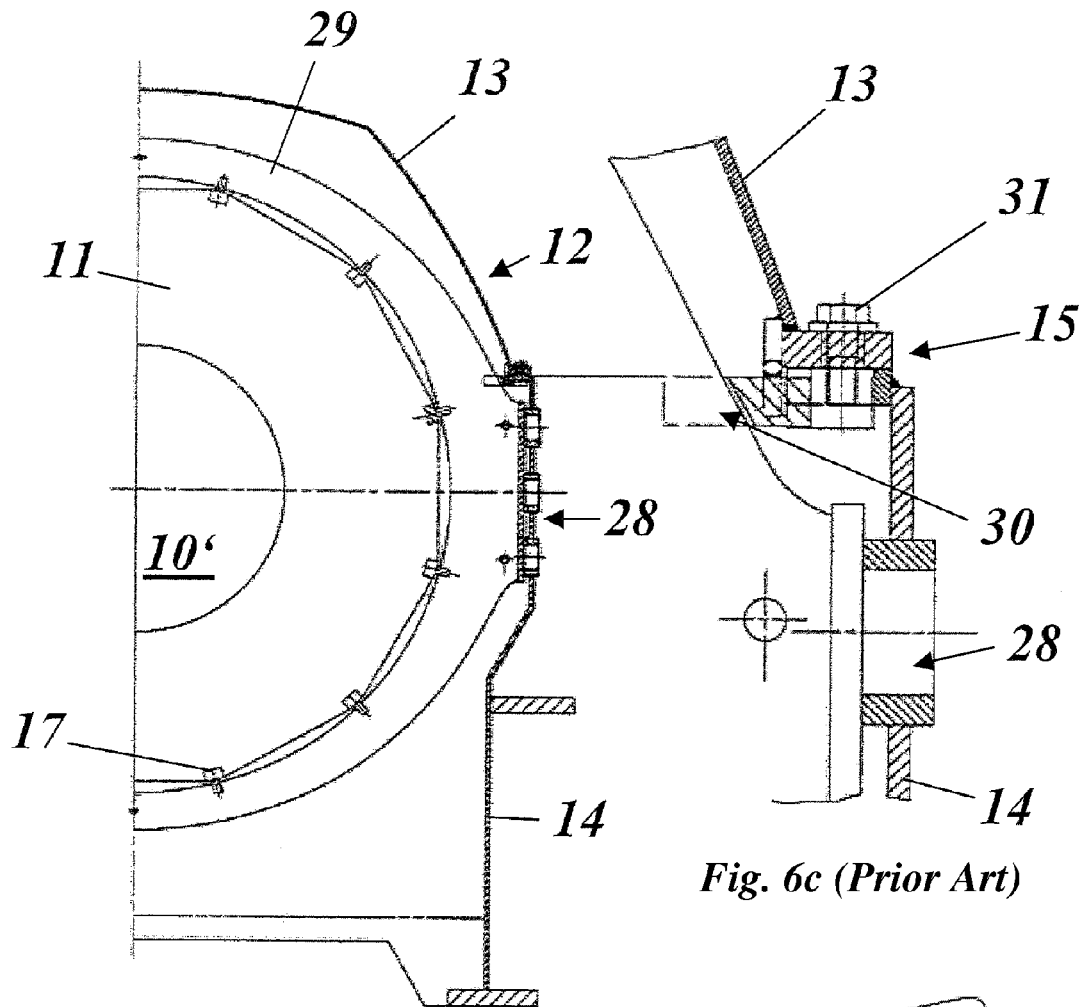
*Fig. 6a (Prior Art)*
*Fig. 6c (Prior Art)*
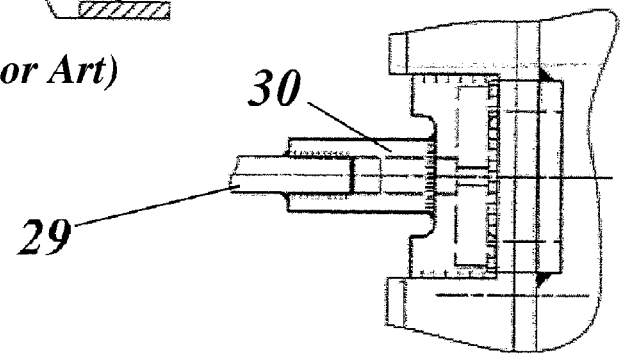
*Fig. 6b (Prior Art)*

ELECTRICAL MACHINE

This application is a Continuation of, and claims priority under 35 U.S.C. § 120 to, International application number PCT/EP2005/054915, filed 29 Sep. 2005, and claims priority therethrough under 35 U.S.C. § 119 to Swiss application number 01690/04, filed 13 Oct. 2004, the entireties of which are incorporated by reference herein.

BACKGROUND

1. Field of Endeavor

The present invention relates to the field of rotating electrical machines.

2. Brief Description of the Related Art

EP-A1-0 166 114 and EP-A2-0 633 643 disclose horizontal-axis electrical machines in which a built-in stator is mounted in a housing which can be split horizontally, by means of a plurality of supporting rings (supporting plates) which are arranged one behind the other in the axial direction and are at a distance from one another. The supporting rings are connected to the housing lower part via attachment parts at opposite points on their external circumference, and are otherwise surrounded by the housing, at a distance. The built-in stator has compression beams, which run distributed in the axial direction, on its outer circumference. In the area of the compression beams, the built-in stator is braced in the supporting rings by means of attachment wedges. This type of installation is mainly used to transmit the thermally dependent axial and radial expansions of the laminated stator core as uniformly as possible to the housing.

The basic configuration of a known machine such as this can be seen in FIG. 6a. The electrical machine 10' has an approximately cylindrical built-in stator 11, which concentrically surrounds the machine axis and a rotor that is not illustrated. The built-in stator 11 is surrounded on the outside by a housing 12, which is composed of a housing upper part 13 and a housing lower part 14. The housing lower part 14 and the housing upper part 13 are detachably connected to one another by means of a separating flange 15 on a horizontal plane. The built-in stator 11 is firmly wedged to the compression beams 17 by means of wedges in a plurality of supporting rings 29, only one of which can be seen in FIG. 6a. The supporting rings 29 are connected to the housing lower part 14 via an attachment apparatus 28 at two horizontal opposite points, and are at a distance from the housing 12 over the rest of their circumference. The built-in stator 11 is located freely in the housing between the supporting rings 29, as is illustrated in FIG. 2.

However, the described way of installation leads to a number of problems. On the one hand, undesirable deformation of the housing 12 can occur when the machine is raised by means of ropes on bollards (16 in FIG. 2) during transportation, with these bollards themselves being fitted to the outside of the housing 12, for this purpose; on the other hand, the housing can start to oscillate during operation of the machine, not only causing noise but also mechanically loading the entire structure.

In the past, solutions as shown in FIGS. 1 and 6 have been implemented for both problems. As shown in FIG. 1, the housing deformation during lifting of the machine was reduced by providing locking apparatuses 18' between the housing, or the housing lower part 14, and the built-in stator 11. The individual locking apparatus 18' includes a threaded sleeve 19, which is mounted directly underneath the separating flange 15 on the housing lower part 14 and points radially inwards, and into which a locking screw 20 is screwed from the inside. For locking, the locking screw 20 is unscrewed, with the housing upper part removed, to such an extent out of the threaded sleeve 19 that the upper face of the screw head 21 is pressed against the compression beam 17 that is fitted to the built-in stator 11. When the locking screw 20 reaches its limit position, it is fixed in the threaded sleeve 19 by a fixing screw 22. Once all of the locking screws have been positioned appropriately on the built-in stator, the housing is closed. The lock between the housing and the built-in stator 11 prevents housing deformation during lifting on the bollards by means of a wire cable during transportation. However, the lock remains positioned on the built-in stator 11 in the installation, during operation. This influences the vibration behavior of the housing during operation and can lead to undesirable high local or global oscillation amplitudes.

As shown in FIG. 6, coupling pieces 30 are used in order to reduce housing oscillations during operation, and provide a firm coupling between the housing 12 and the built-in stator suspension (supporting ring 29). This fixed coupling directly via that part of the separating flange 15 which is associated with the housing lower part 14 leads, however, at least in some cases to high local or global oscillation amplitudes. Furthermore, the coupling to the housing lower part 14 can result in a non-uniform oscillation behavior in comparison to the housing upper part 13 which, in extreme cases, can lead to fracture of the screw 31 on the separating plane between the housing lower part 14 and the housing upper part 13 (separating flange 15).

SUMMARY

One of numerous aspects of the present invention includes modifying the interaction between the built-in stator and the housing in an electrical machine of the known type, in such a manner that the housing oscillations which occur during operation are greatly reduced without having to sacrifice the robustness which is required for transportation.

In accordance with some of the principles of the present invention, one aspect includes providing additional apparatuses for fixing of the housing relative to the built-in stator or relative to the built-in stator suspension or the supporting rings, which are in the form of apparatuses which can be adjusted from outside the housing. This makes it possible to vary or adjust the coupling between the housing and the built-in stator without any difficulties from the outside at any time, in order to minimize housing oscillations. In particular, a change such as this can be implemented between transportation of the machine and operation so that the robustness of the housing during transportation and the reduced coupling during operation can be provided at the same time.

In a first preferred embodiment of the invention, the fixing apparatuses are locking apparatuses, which can be released from outside the housing, for locking between the housing and the built-in stator, in that the locking apparatuses each have a locking screw which is mounted in the housing such that it can be screwed in from the outside and whose inner end can be positioned on the built-in stator, in that the built-in stator has a plurality of compression beams, which run in the axial direction, on its outer circumference, and in that the inner ends of the locking screws can be positioned on the compression beams. For transportation, the locking screws can be positioned on the built-in stator in order to prevent deformation of the housing as a result of the forces which occur during transportation. Once the machine has been positioned in situ, the locking screws can be undone from the outside without any problems in order to provide oscillation decoupling between the housing and the built-in stator.

According to one development of this embodiment, which is preferred because of its simplicity, the locking screws are each mounted, such that they can be screwed in, in a radially aligned threaded sleeve, which is attached to the housing, and in particular is welded to it, and in that devices are provided for checking the locking screw in the threaded sleeve. In this case, the lengths of the threaded sleeves and of the locking screws are chosen such that, after the locking screws have been unscrewed, an adequate clearance remains between the threaded sleeves and the built-in stator, and such that, once the locking screws have been positioned on the built-in stator, a check screw can in each case be screwed into the threaded sleeve from the outside. The locking screws and/or the check screws preferably each have a hexagonal recess at their outer end for operation.

If apparatuses for lifting the machine are arranged on the housing, it is expedient for the locking apparatuses to be arranged distributed over the housing in such a manner that the locking apparatuses prevent deformation of the housing when the machine is being raised on the lifting apparatuses. If the housing is composed of a housing upper part and a housing lower part, which parts are detachably connected to one another at a separating flange, the locking apparatuses are preferably attached to the housing in the immediate vicinity of the separating flange.

In a second preferred embodiment of the invention, the fixing apparatuses are tuning apparatuses, which can be adjusted from outside the housing, for adjustable coupling of the housing to the built-in stator suspension and to the supporting rings with the tuning apparatuses each having a tuning screw which is mounted in the housing such that it can be screwed in from the outside, and whose inner end can be positioned on the built-in stator suspension or on the outer edge of the supporting ring. In particular, the tuning screws are each mounted in an essentially radially aligned threaded sleeve such that they can be screwed in, which threaded sleeve is attached, in particular welded, to the housing.

BRIEF DESCRIPTION OF THE DRAWINGS

The invention will be explained in more detail in the following text with reference to exemplary embodiments and in conjunction with the drawing, in which:

FIG. 6 includes a plurality of figure elements FIGS. 6a-c showing different views of an electrical machine having a fixed coupling as used in the past, between the housing and the built-in stator suspension (the supporting ring)

DETAILED DESCRIPTION OF EXEMPLARY EMBODIMENTS

Figure 1:
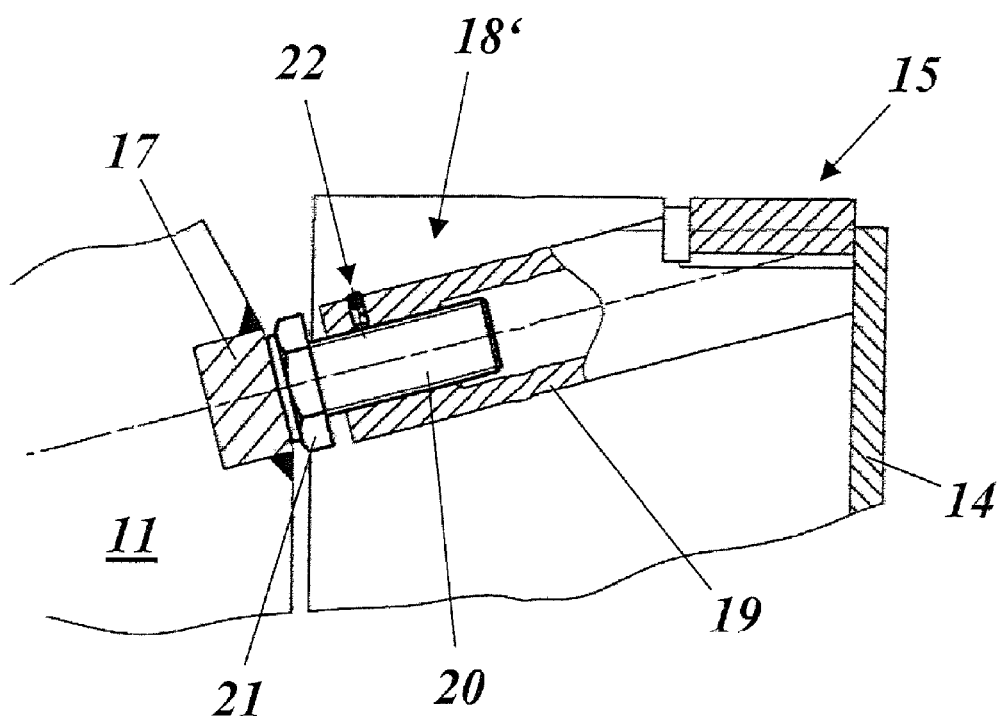
FIG. 1 shows a detail of a section through a locking apparatus which cannot be changed, as has been used in the past.
Figure 2:
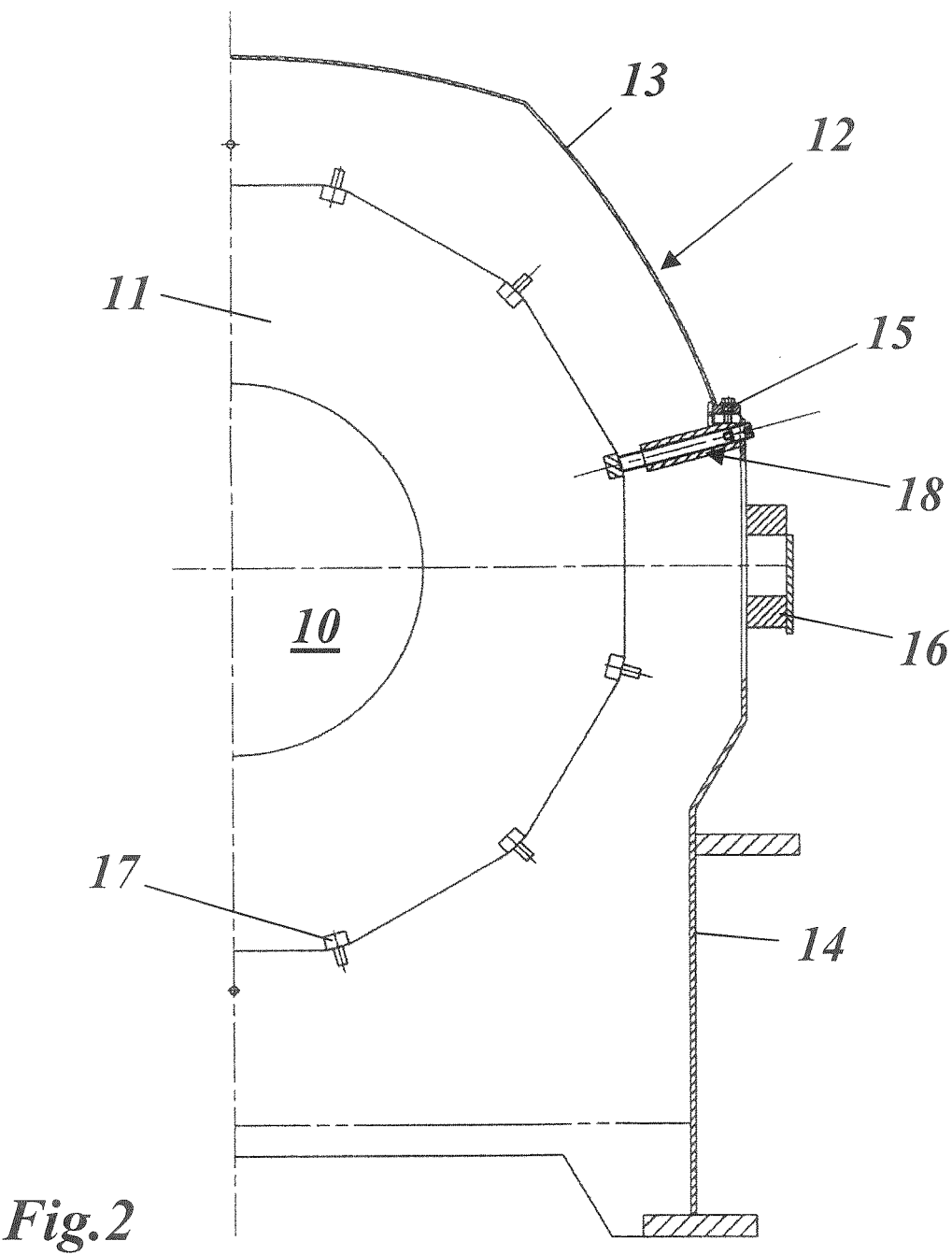
FIG. 2 shows the cross section through an electrical machine having a locking apparatus according to one preferred exemplary embodiment, in the locked state.
Figure 3:
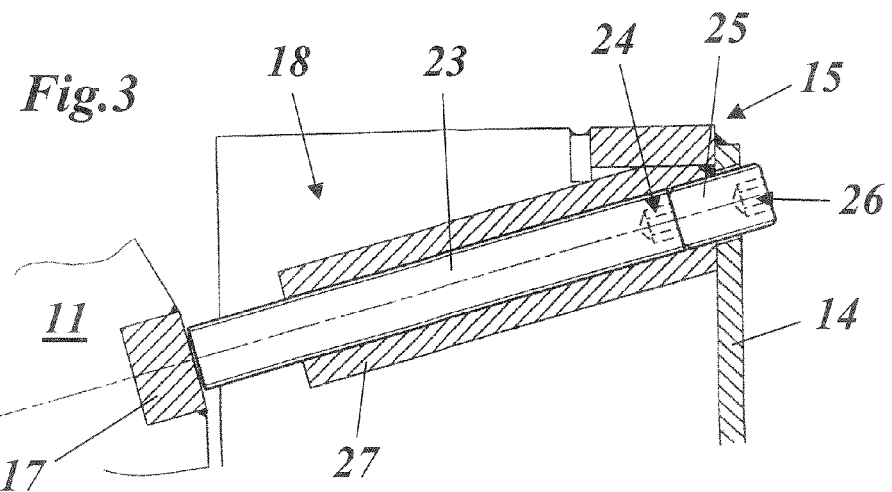
FIG. 3 shows a highly enlarged detail of the locking apparatus from FIG. 2, in the locked state.
Figure 4:
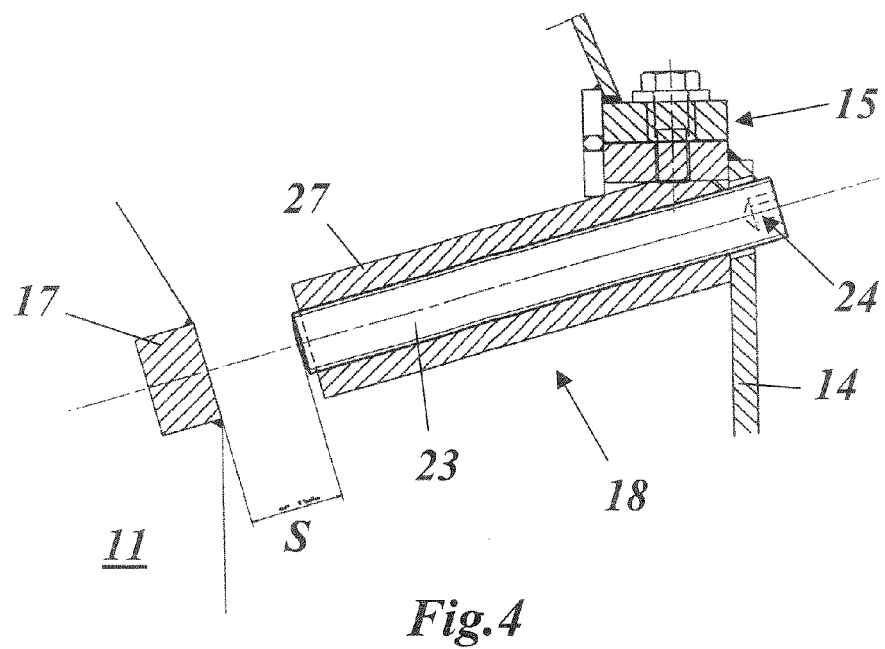
FIG. 4 shows an illustration comparable to FIG. 3 of the unlocked (released) locking apparatus shown in FIG. 2.
Figure 5:
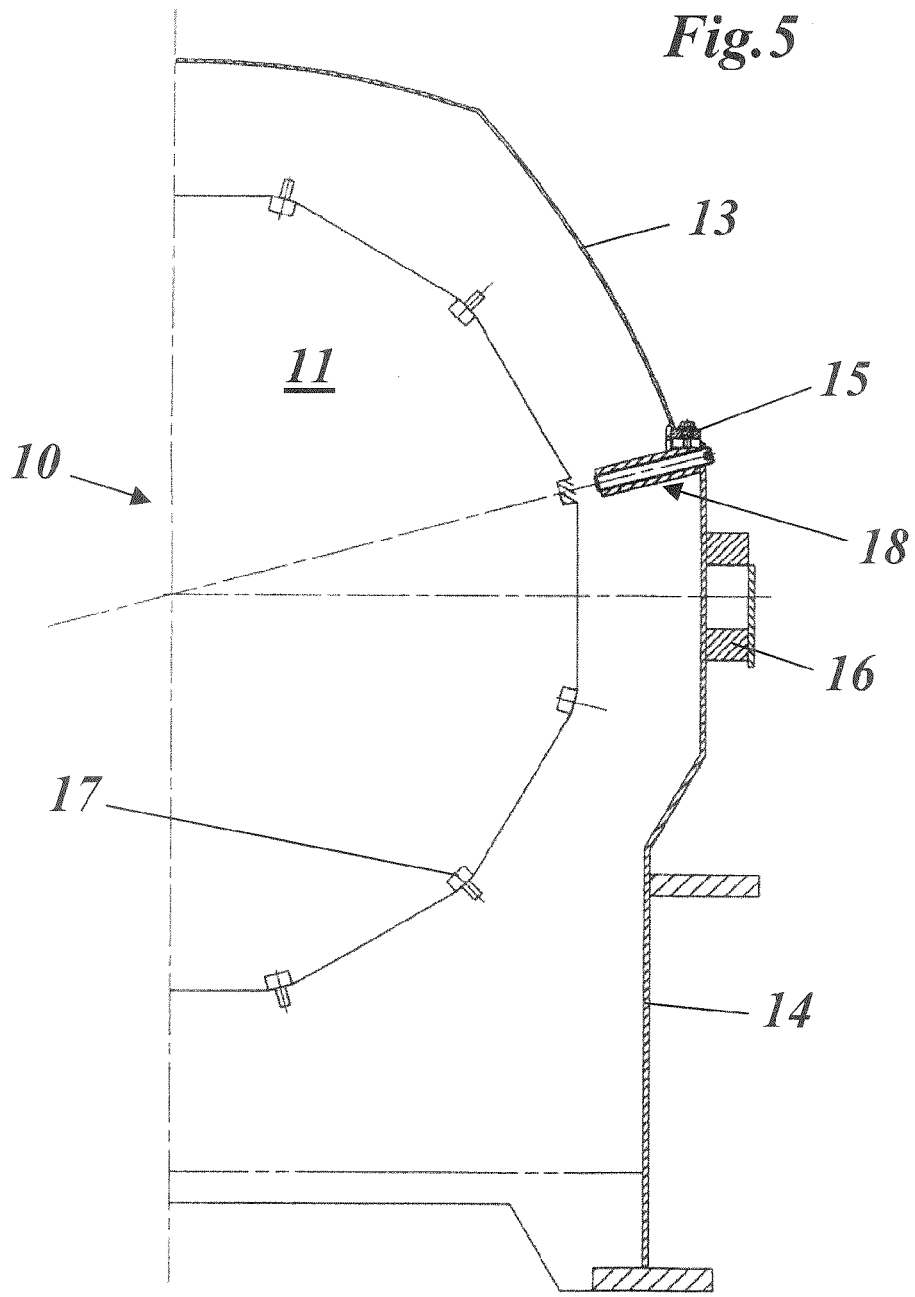
FIG. 5 shows the machine from FIG. 2 in the unlocked state.

FIGS. 2 to 5 show details, on different scales, of a first preferred exemplary embodiment of the invention in the form of a locking apparatus 18, with FIGS. 2 and 3 showing the locking apparatus 18 in the locked state, while FIGS. 4 and 5 show the locking apparatus in the released state. As already described initially, the horizontal-axis electrical machine 10 illustrated in FIGS. 2 to 5, and which in particular is in the form of a generator, has a built-in stator 11 with compression beams 17 arranged on the outer circumference. The built-in stator 11 is accommodated and mounted in a housing 12 which is composed of a housing lower part 14 and a housing upper part 13, which are detachably connected by a separating flange 15 on a horizontal separating plane. The built-in stator 11 is connected to the housing 12 via a plurality of supporting rings, which are not illustrated in FIGS. 2 to 5. In contrast, between the supporting rings, it is surrounded by the housing 12, at a distance. Bollards 16 which project at the side are welded to the outside of the vertical side walls of the housing lower part 14 in order to make it possible to fit a cable in each case, for lifting the machine 10 during transportation. In order to absorb the deformation forces which act on the housing 12 during lifting of the machine, locking apparatuses 18, by which the housing 12 can be supported on the built-in stator 11, are provided—as in the case of the earlier solution illustrated in FIG. 1—directly above the horizontal plane passing through the bollard 16, and immediately underneath the separating flange 15.

The physical design of the locking apparatuses 18 can be seen in the enlarged illustration in FIGS. 3 and 4. An externally accessible threaded sleeve 27 is welded into the housing lower part 14 underneath the separating flange 15 and extends inwards in the radial direction with respect to the machine axis (which is at right angles to the plane of the drawing). A locking screw 23 in the form of a threaded rod is screwed into the threaded sleeve 27. The inner end of the locking screw 23 can be positioned on the built-in stator 11 for locking to the compression beam 17 (FIG. 3).

The lengths of the threaded sleeve 27 and of the locking screw 23 are chosen such that, once the locking screw 23 has been undone or unscrewed (FIG. 4), an adequate clearance S remains between the threaded sleeve 27 and the built-in stator 11, and such that, once the locking screw 23 has been positioned on the built-in stator 11 (FIG. 3), a check screw 25 can in each case additionally be screwed into the threaded sleeve 27 from the outside, in order to check the locking screw 23. Both the locking screw 23 and the check screw 25 have a respective hexagonal recess 24 and 26 at their outer ends, by which they can be operated from the outside.

The locking which the locking apparatus 18 allows between the housing 12 and the built-in stator 11 prevents housing deformation during lifting of the machine on the bollards 16 by a wire cable during transportation. In order to avoid the need for disassembly, which would involve effort, of the housing upper part 13 and of the housing cover including all of the fittings in the installation in order to reset the locking, this can now be reset from the outside.

The locking apparatus 18 is operated as follows: for transportation of the machine 10, the locking screw 23 is positioned on the built-in stator 11 from the outside through the housing 12, and is then secured by the check screw 25 (FIG. 3). During all transportation operations, the lock remains fitted. In the installation, the check screw 25 is then removed before setting up the machine 10, the locking screw 23 is removed, and is secured by a spot weld, center-punch mark or the like (FIG. 4). The clearance S in this case ensures that vibration can no longer be transmitted from the built-in stator 11 to the housing 12. In this case, it is self-evident that a plurality of locking planes is required over the generator length in the axial direction.

Figure 7:
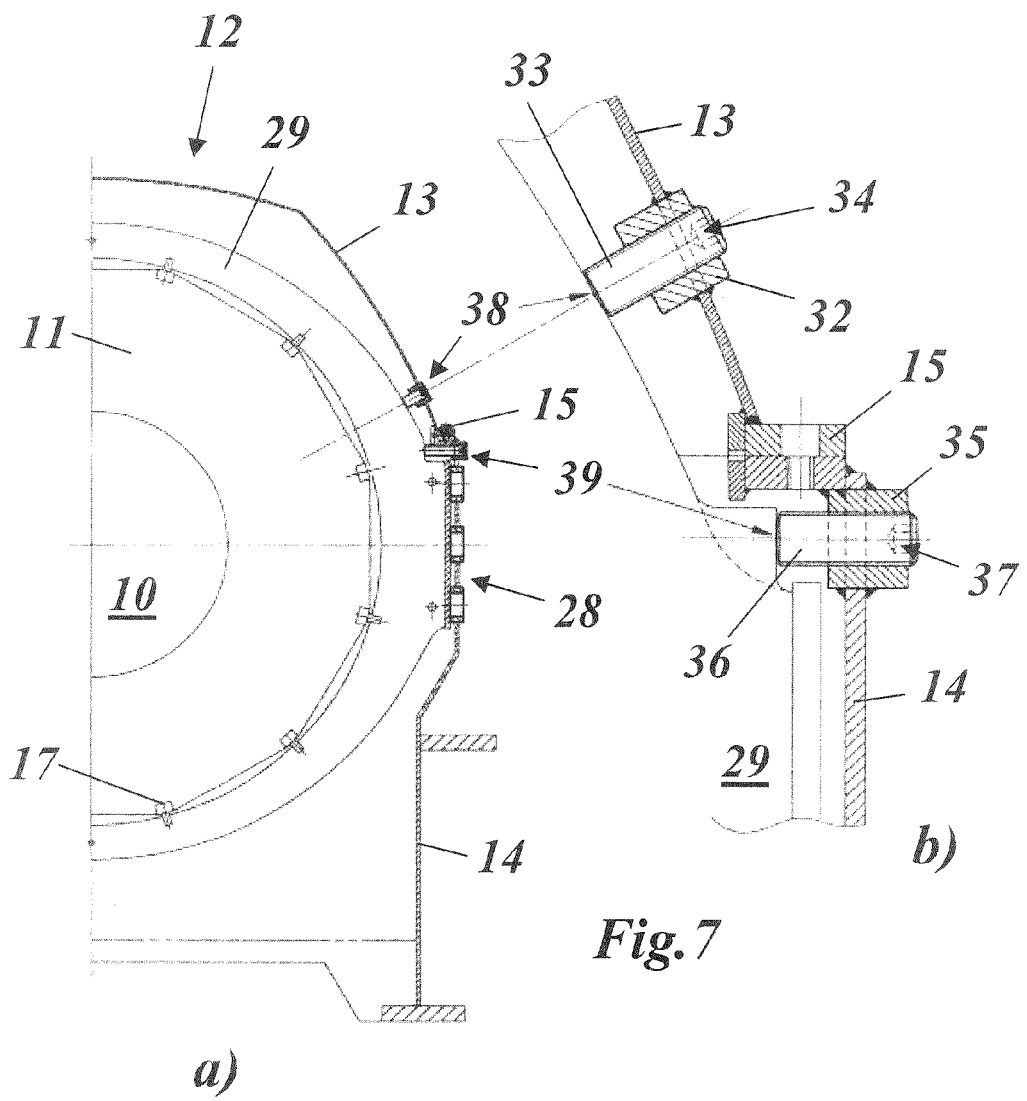
FIG. 7 shows an illustration comparable to FIG. 6 and having two figure elements 7a and 7b of an electrical machine having an adjustable coupling according to another preferred exemplary embodiment of the invention.

Although the locking between the housing 12 and the built-in stator 11 is released for operation of the machine, in order to prevent oscillation of the housing 12, deliberate, adjustable coupling between the housing 12 and the built-in stator suspension, that is to say in the present case the supporting rings 29, can reduce housing vibration during operation. For this purpose, as shown in FIG. 7, tuning screws 33 and/or 36 which can be adjusted from the outside are provided on the housing 12, in the vicinity of the separating flange 15. The tuning screws 33, 36 are mounted such that they can be screwed into threaded sleeves 32 and 35, respectively, from the outside. The tuning screws 33, 36 can be positioned at the outer edges of the built-in stator suspension or of the supporting rings 29, and can produce a variable prestress. The threaded sleeves 32, 35 are firmly welded to the housing upper part 13 and to the housing lower part 14, respectively. The tuning screws 33, 36 are each operated from the outside by a respective hexagonal recess 34 and 37.

The oscillation behavior is tuned as follows: the tuning screws 33 and 36 are positioned against the built-in stator suspension (supporting rings 29) from the outside, through the housing 12. When the machine is being set up, the housing oscillation amplitude is then minimized by appropriate deformation or completely releasing the tuning screws 33 and 36. The tuning screws can then be secured in the set position by a spot weld or center-punch mark or the like.

Furthermore, a synchronous oscillation behavior of the housing upper part 13 and housing lower part 14 can also be ensured by using an appropriate interlocking connection (for example by reamed bolts) in the separating flange 15. This means that only one tuning screw 33 or 36 need be used in the housing upper part 13 or in the housing lower part 14 per tuning plane.

Once again, it is self-evident that a plurality of tuning planes is required over the generator length in the axial direction in order to optimize the oscillation behavior.

LIST OF REFERENCE SYMBOLS

| | |
|---|---|
| 10, 10' | Electrical machine (generator) |
| 11 | Built-in stator |
| 12 | Housing |
| 13 | Housing upper part |
| 14 | Housing lower part |
| 15 | Separating flange |
| 16 | Bollard |
| 17 | Compression beam |
| 18, 18' | Locking apparatus |
| 19, 27 | Threaded sleeve |
| 20, 23 | Locking screw |
| 21 | Screw head |
| 22 | Fixing screw |
| 24, 26 | Hexagonal recess |
| 25 | Check screw |
| 28 | Attachment apparatus |
| 29 | Supporting ring |
| 30 | Coupling piece |
| 31 | Screw |
| 32, 35 | Threaded sleeve |
| 33, 36 | Tuning screw |
| 34, 37 | Hexagonal recess |
| 38, 39 | Tuning apparatus |
| S | Clearance |

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. An electrical machine comprising:
    a housing;
    a built-in stator suspension;
    a built-in stator mounted in the housing by the built-in stator suspension, wherein the housing surrounds the built-in stator at a distance;
    a fixing apparatus configured and arranged to fix the housing relative to the built-in stator and with respect to the built-in stator suspension, the fixing apparatus being configured and arranged to be adjustable from outside the housing;
    wherein the fixing apparatus comprises locking apparatus configured and arranged to be released from outside the housing and to lock between the housing and the built-in stator; and
    wherein the locking apparatus includes at least one locking screw mounted in the housing such that the at least one locking screw can be screwed in from the outside and having an inner end which can be positioned on the built-in stator.

2. The electrical machine as claimed in claim 1, wherein the built-in stator has a plurality of compression beams which run in the axial direction, on an outer circumference of the built-in stator; and
    wherein inner ends of the at least one locking screw can be positioned on the compression beams.

3. An electrical machine, comprising:
    a housing;
    a built-in stator suspension;
    a built-in stator mounted in the housing by the built-in stator suspension, wherein the housing surrounds the built-in stator at a distance;
    a fixing apparatus configured and arranged to fix the housing relative to the built-in stator and with respect to the built-in stator suspension, the fixing apparatus being configured and arranged to be adjustable from outside the housing;
    wherein the fixing apparatus comprises a locking apparatus configured and arranged to be released from outside the housing and to lock between the housing and the built-in stator;
    at least one radially aligned threaded sleeve;
    wherein the locking apparatus includes at least one locking screw mounted in the housing such that the at least one locking screw can be screwed in from the outside and having an inner end which can be positioned on the built-in stator;
    wherein the at least one locking screw is mounted to be screwed in the at least one radially aligned threaded sleeve;
    wherein the at least one radially aligned threaded sleeve is attached to the housing; and
    at least one check device for retaining the at least one locking screw in the at least one threaded sleeve.

4. The electrical machine as claimed in claim 3, wherein the lengths of the at least one threaded sleeve and of the at least one locking screw are such that, after the at least one locking screw has been unscrewed, an adequate clearance remains between the at least one threaded sleeve and the built-in stator, and such that the at least one check device can be positioned in the at least one threaded sleeve from the outside, once the at least one locking screw has been positioned on the built-in stator.

5. The electrical machine as claimed in claim 3, wherein the at least one check device comprises at least one check screw.

6. The electrical machine as claimed in claim 5, wherein the at least one locking screw, the at least one check screw, or both, each have a hexagonal recess at an outer end for operation.

7. The electrical machine as claimed in claim 3, wherein the housing comprises a housing upper part, a housing lower part, and a separating flange, the upper and lower housing parts detachably connected to one another at the separating flange; and
    wherein the locking apparatus is attached to the housing in the immediate vicinity of the separating flange.

8. The electrical machine as claimed in claim 3, wherein the at least one radially aligned threaded sleeve is welded to the housing.

9. An electrical machine comprising:
    a housing;
    a built-in stator suspension;
    a built-in stator mounted in the housing by the built-in stator suspension, wherein the housing surrounds the built-in stator at a distance;
    a fixing apparatus configured and arranged to fix the housing relative to the built-in stator and with respect to the built-in stator suspension, the fixing apparatus being configured and arranged to be adjustable from outside the housing;
    wherein the fixing apparatus comprises tuning apparatus is configured and arranged to be adjusted from outside the housing, and configured and arranged to adjustably couple the housing to the built-in stator suspension and to the supporting rings; and
    wherein the tuning apparatus has at least one tuning screw mounted in the housing such that it can be screwed in from the outside, the at least one tuning screw having an inner end and being configured and arranged so that the inner end can be positioned on the built-in stator suspension or on the outer edge of the supporting ring.

10. The electrical machine as claimed in claim 9, further comprising:
    at least one essentially radially aligned threaded sleeve;
    wherein the at least one tuning screw is mounted in the at least one threaded sleeve such that the at least one tuning screw can be screwed in; and
    wherein the at least one threaded sleeve is attached to the housing.

11. The electrical machine as claimed in claim 10, wherein the at least one tuning screw has a hexagonal recess at an outer end, for operation.

12. The electrical machine as claimed in claim 10, wherein the at least one threaded sleeve is welded to the housing.

* * * * *